Aug. 25, 1925.

K. C. MILLER 1,550,834

COMPENSATING BEARING

Filed April 1, 1922

Inventor
KAY C. MILLER
By his Attorney
Abel L. Browning

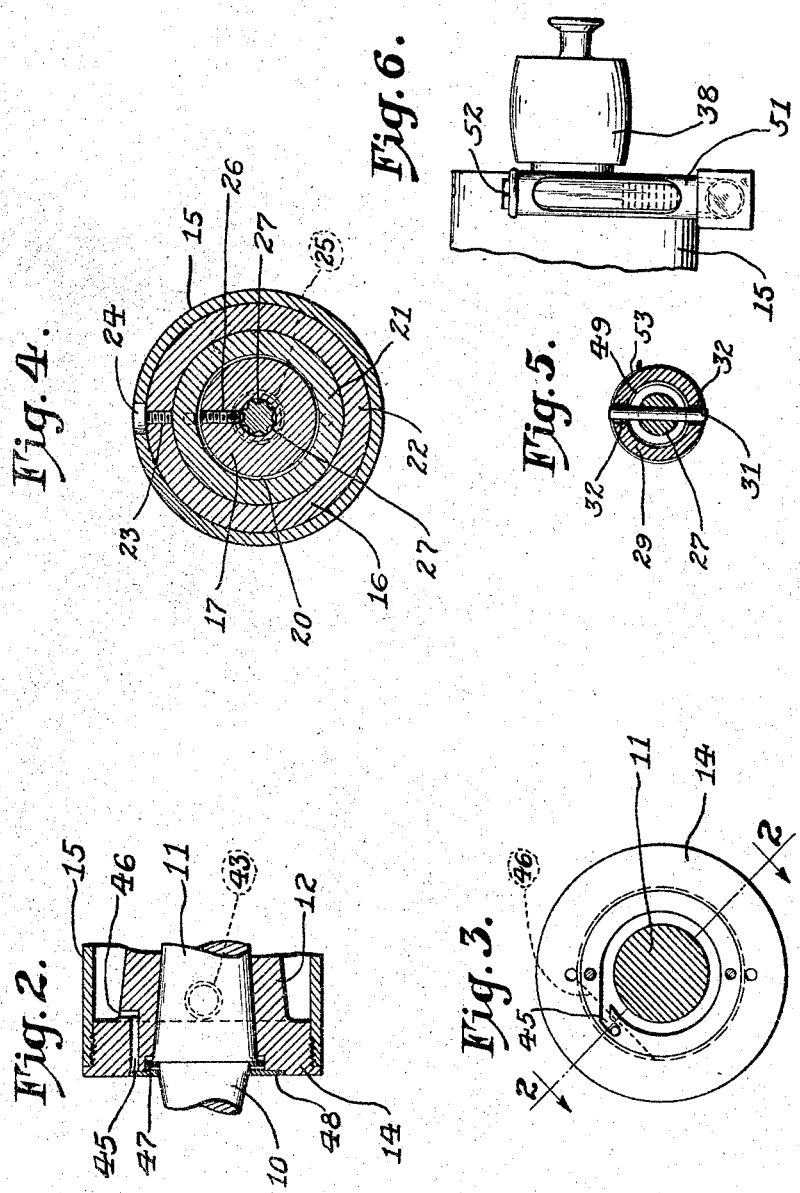

Patented Aug. 25, 1925.

1,550,834

UNITED STATES PATENT OFFICE.

KAY C. MILLER, OF NEW BRUNSWICK, NEW JERSEY.

COMPENSATING BEARING.

Application filed April 1, 1922. Serial No. 548,584.

*To all whom it may concern:*

Be it known that I, KAY C. MILLER, a citizen of the United States, and resident of New Brunswick, in the county of Middlesex and State of New Jersey, have invented certain new and useful Improvements in Compensating Bearings, of which the following is a specification.

This invention relates generally to a spindle construction and a bearing therefor which automatically compensate for physical changes in the spindle due to variations in temperature.

As is well known it is exceedingly difficult to so mount a rotatable shaft or spindle that it will revolve with a sufficient degree of freedom from vibration to be effectively used in operations requiring a high degree of accuracy and precision. The vibration of a spindle in its bearing is the result largely of the physical expansion of the enclosing bearing due to rise of temperature in operation and a resulting looseness of fit of the spindle therein, so that unless the spindle rotates precisely about its center of gravity, an eccentricity is produced which brings about the referred to objectionable vibration of the spindle in its seat in the enlarged bearing. In addition the linear or longitudinal expansion of the shaft under like conditions is a serious detriment to accurate operations with a cutting or other tool mounted on the shaft.

It is an object of the present invention to provide a spindle and a bearing mounting therefor which will be free from the objections referred to and with which cutting, grinding, or other operations can be performed with a relatively high degree of precision.

The invention consists in the provision of a spindle and a bearing therefor having a construction which automatically compensates for and neutralizes the effects of physical changes produced in the spindle by variations in temperature. The invention includes a spindle having a tapered section and a correspondingly tapered bearing in which the tapered section of the spindle is journaled.

In order to compensate for differences in expansion and prevent corresponding faulty fitting between the spindle and the box or bearing which may arise through different coefficients of expansion or different temperatures in the two members, means are provided for utilizing the longitudinal expansion of either the spindle or the hollow bearing to correspondingly adjust the tapered spindle section axially to maintain the same uniform fit between the spindle and the box under all temperature conditions.

In addition longitudinal expansion of the spindle is compensated for by fixedly mounting the enlarged end of the bearing but permitting the smaller end to move to accommodate the longitudinal expansion of the structure under a rise in temperature. It will be seen that this neutralizes longitudinal expansion of the spindle in that axial movement of the smaller end of the spindle may be designed to exactly compensate for the longitudinal expansion of the spindle as a whole with the result that the free end of the spindle which carries the cutting tool partakes of no axial movement.

Another feature of the invention resides in an improved system of lubrication for a rotatable shaft or spindle.

In the drawings in which a preferred embodiment of the invention has been selected for illustration, Figure 1 is a view in longitudinal section of a portion of a grinding machine in which the invention is included.

Figure 2 is a sectional view showing a detail of the device shown in Figure 1 taken on the line 2—2 of Figure 3.

Figure 3 is a cross-section of the device shown in Figure 1 taken along the line 3—3.

Figure 4 is a view similar to Figure 3 taken along the line 4—4 of Figure 1.

Figure 5 is a detail view showing a flexible coupling connection used in the device.

Figure 6 is a fragmentary view of a portion of the device showing an oil gage which may be included in the apparatus.

Figure 1:
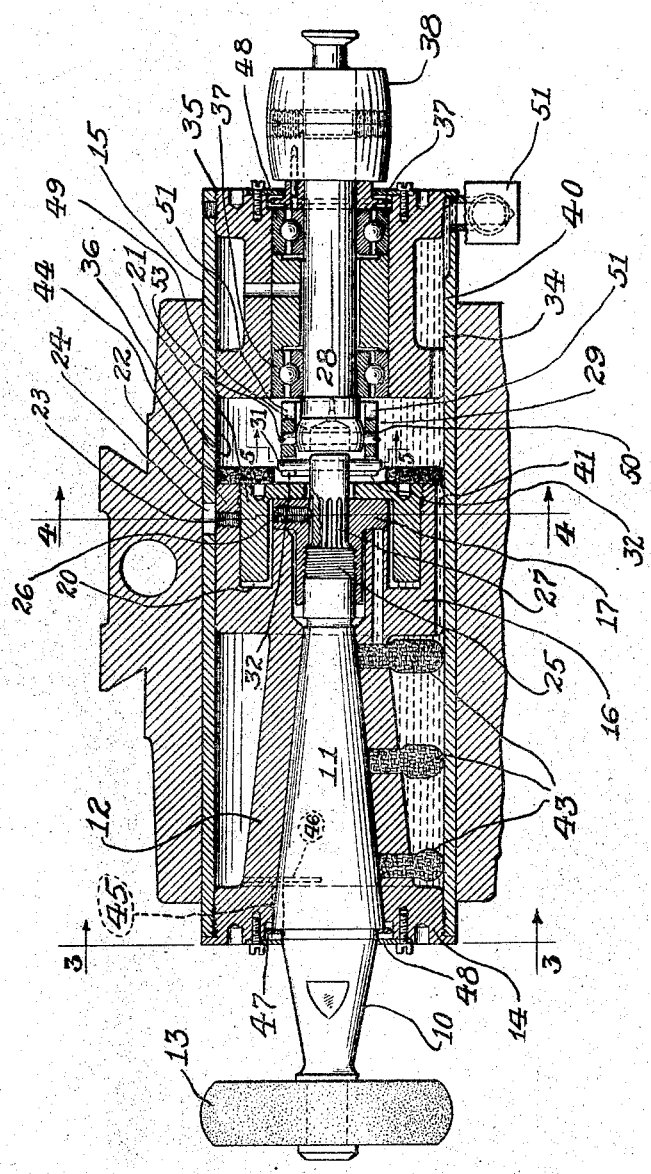

Referring to the drawings for a more detailed description of the invention a spindle 10 is provided with a tapered section 11 which is journaled in a complementary formed bearing member 12. The rotatable spindle 10 is designed to carry any suitable cutting or grinding tool such as the grinding wheel 13.

The conical bearing member 12, as will be seen in Figure 1, has a screw-threaded engagement at its enlarged base end 14 with the inner surface of a cylindrical casing or frame-work 15 in which the spindle 10 and its supporting bearing 12 is enclosed. The other or converging end of the bearing member 12 is provided with an enlarged section 16 which has a sliding fit in the cylindrical casing 15 so that it can move axially in the casing 15 to accommodate the longitudinal expansion of the bearing member 12 which takes place under the increase in temperatures produced by running conditions.

In order to compensate for radial expansion under increase in temperature of the bearing member 12 which tends to produce a loose fit, or for radial expansion of the spindle 10 which tends to produce a tight fit between the spindle and the bearing, means are provided whereby the longitudinal expansion of the bearing 12 which accompanies the radial expansion referred to, operates to draw the tapered spindle section toward the converging end of the bearing. On the other hand radial expansion of the spindle section 11 is accompanied by a longitudinal expansion which moves the tapered section outwardly with relation to the bearing member 12 and thereby prevents a tightening of the fit of the bearing in its seat. The compensating effect of the structure described is so designed and proportioned as to constantly maintain a vibration-preventing closeness of fit between the spindle and the bearing 12 in which it is journaled.

The means referred to includes constructional features wherein a radially extending flange 17 carried by the spindle 10 rotates in a radially extending seat in the end section 16 of the bearing and has its forward and rearward surfaces engaged by abutting surfaces provided in the bearing. It will be seen that the smaller end of the tapered spindle is thereby caused to move axially in exact accordance with the movements of the end section of the bearing so that the expansion of the bearing under a rise of temperature acts on the flange 17 of the spindle to draw the tapered spindle section into the bearing seat and thereby maintain a proper running fit between the tapered spindle section and the bearing even when the bearing is radially expanded through the effect of heat.

I make use also of the constructional features referred to and also take advantage of the different coefficients of expansion possessed by different metals under increase of temperature to compensate for linear or longitudinal expansion of the spindle and thereby maintain a tool carried by the spindle in an axially immovable position.

This is achieved by the feature which provides for the sliding movement of the bearing section 16 to the right within the cylindrical casing 15 when the bearing members expand under the effects of a rise in temperature. It will be seen that the corresponding movement of the right-hand end of the spindle 10 will neutralize or compensate for the expansion of the spindle which would otherwise cause the free end of the spindle and the tool 13 carried thereby to be moved to the left. The net result is that the tool 13 is not moved axially at all and is maintained in a fixed axial position. This feature is particularly useful in such work as grinding raceway grooves in the race rings of double or single row ball bearings.

In order to exactly compensate for the physical expansion of the parts caused by heat the angle of the tapered or conical portion of the spindle and the complementary bearing member is chosen by taking into account the relative coefficients of expansion of the steel of which the spindle is composed and of the bronze or other metal of which the bearing member is formed.

Another advantage of the spindle construction described resides in the relatively great mass of the tapered spindle portion 11 whereby a considerable gyroscopic and centering effect is produced which further tends to stabilize the running of the spindle under all conditions and prevent objectionable vibration.

The construction of the bearing section 16 includes an axially extending annular groove 20 in which is fitted a follower 21 which engages the right-hand surface of the flange 17 and holds the flange in contact with an abutting flange 22 forming part of the bearing. The follower 21 is screw-threaded in its seat and can be turned to take up wear or to otherwise provide for adjustment. A locking screw 23 can be operated through an opening 24 in the casing 15.

The flange 17 carried by the spindle 10 has a screw threaded connection with the spindle 25 and is provided with a locking screw 26 for engagement with longitudinally extending grooves 27 in the spindle.

In a preferred form of the invention I couple the inner end of the working spindle 10 to a driving spindle 28, the connection between the two spindles being made by means of a flexible coupling 29 which will act to prevent the transmission of vibrations from driving shaft 28 to working spindle 10 in such manner that an equal torque is exerted by the driving shaft on either side of the center line of the working spindle. The coupling construction preferably includes a cylindrical sleeve 30 which is mounted on the ball shaped end 49 of the driving shaft. The sleeve 30 is caused to rotate with the driving shaft by the pin 50 which is seated diametrically in the end of the shaft. The sleeve 30 can rock or rotate slightly about the pin 31 as a pivot. A pair of notches 32 in line with the pin engage a driving pin 50 on the end of the work spindle 10. Similar notches 51 are preferably provided at the other end of the sleeve 30 to compensate for possible unbalancing effects in operation.

The driving shaft 28 is mounted for rotation in a spool shaped supporting member 34 between which and the shaft are mounted carefully and accurately made ball bearings 37. The supporting member 34 has a screw threaded connection with the casing 15 at 35, and is free to slide in the casing at 36. A suitable driving pulley 38 is carried by the outer end of the spindle 28.

Preferably grooves 41 cut in the peripheries of the inner flanges of the two bearing members provide for the flow of lubricating material from one end of the casing 15 to the other. The fibrous material 37 between the bearing members serves to feed lubricant to the wick member 42 which supplies oil to the rotatable flange 17 carried by the work spindle 10.

Wick members 43 supply oil to the tapered spindle section 11 from the left-hand oil chamber 40 and an axially extending wick member 44 supplies oil to one face of the flange 17. It will be clear that centrifugal action tends to cause oil fed to the surface of the tapered spindle section to gradually flow toward the enlarged end. Advantage is taken of this feature to produce a circulation of the lubricant within the device and a constant replacement and renewal of the lubricant on the working surfaces.

The outer end flange of the bearing member 12 is provided on its inner periphery with a tangentially directed oil-receiving channel 45 into which oil is thrown by the adjacent rotating enlarged ends of the tapered spindle section 11. The oil received in the channel by the centrifugal pump effect referred to flows into a cut-out segmental opening 46 of the bearing into the chamber 40 of the casing 15 from which it may again ascend through the wicks 43 into engagement with the tapered spindle section. Suitable flanges or baffle members 47 and 48 prevent the escape of oil from the casing. I preferably embody in the construction an oil gage 51 such as is shown in Figure 6 of the drawings to guard against running the spindle without a sufficient supply of oil. Oil may be supplied to the casing 15 through removal of the cap member 52 of the oil gage.

What I claim is:

1. In a spindle and bearing construction, a tapered spindle section, a tapered bearing in which said tapered spindle section is journaled, and means located at their reduced ends of the tapered spindle section and bearing for preventing relative axial movement thereof, whereby the elongation accompanying radial expansion of the tapered spindle section will cause the tapered spindle section to expand axially toward the enlarged end of the bearing to maintain the fit of the tapered section in the tapered bearing.

2. In a spindle and bearing construction, a tapered spindle section, a tapered bearing in which the tapered spindle section is journaled, and means located at their reduced ends of the tapered spindle section and bearing for preventing relative axial movement thereof, whereby the elongation of the bearing accompanying radial expansion thereof will cause the tapered spindle section to be drawn further into the bearing and the elongation of the tapered spindle section accompanying radial expansion thereof will move the tapered spindle section outwardly in the bearing to maintain the fit of the spindle in the bearing.

3. In a spindle and bearing construction, a tapered spindle section, a tapered bearing in which said tapered spindle section is journaled, and means located at their reduced ends of the tapered spindle section and bearing for preventing relative axial movement thereof, whereby the elongation accompanying radial expansion of the bearing will cause the tapered spindle section to be drawn further into the bearing and maintain the fit of the spindle section in the bearing.

4. In a spindle and bearing construction, a tapered spindle section, a tapered bearing in which said tapered spindle section is journaled, and coacting means carried by the spindle and the bearing adjacent the reduced ends thereof, whereby relative axial movement of the coacting means is prevented to thereby cause the tapered spindle section to be drawn into the bearing in accordance with expansion of the bearing in operation.

5. In a spindle and bearing construction, a tapered spindle section, a correspondingly tapered bearing in which said tapered spindle section is journaled, a radially extending member carried by the spindle adjacent the reduced end of the tapered section, and a radially extending seat in the tapered bearing in which the radially extending member carried by the spindle is mounted to rotate.

6. In a spindle and bearing construction, a tapered spindle section, a correspondingly tapered bearing in which said tapered spindle section is journaled, a radially extending flange carried by the spindle adjacent the reduced end of the tapered section, a radially extending flange carried by the spindle adjacent the converging end of the tapered section, and a radially extending groove in the tapered bearing into which the radially extending flange extends.

7. In a spindle and bearing construction, a tapered spindle section, a correspondingly tapered bearing in which said tapered spindle section is journaled, coacting means carried by the spindle and the bearing adjacent the reduced portions thereof to prevent relative axial movement of the converging portions, and a casing in which said tapered bearing is mounted against axial movement at its larger end but is left free for axial movement at its smaller end.

8. In a spindle and bearing construction, a tapered spindle section, a correspondingly tapered bearing in which said tapered spindle section is journaled, interengaging radially extending flanges carried by the spindle and the bearing adjacent the portions of least diameter to prevent relative axial movement of the corresponding portions of the bearing and spindle, a cylindrical casing in which the larger end of the bearing has screw threaded engagement, and an enlarged section at the smaller end of the bearing which engages the wall of the cylindrical casing for axial movement therein.

9. In a spindle and bearing construction, a work spindle, a tapered section therein, a correspondingly tapered bearing in which said tapered spindle section is journaled, coacting means carried by the spindle and the bearing adjacent the reduced portions thereof to prevent relative axial movement of the converging portions, a casing in one end of which the larger end of the bearing is mounted against axial movement, the other end of the bearing being free to move axially in the casing, a driving spindle, a bearing therefor mounted in the other end of the casing, and a flexible coupling connecting the adjacent ends of the two spindles.

10. In a spindle and bearing construction, a work spindle having a tapered section therein, a correspondingly tapered bearing in which said tapered spindle section is journaled, coacting means carried by the spindle and the bearing adjacent the converging portions thereof to prevent relative axial movement of the reduced portions, a casing in one end of which the larger end of the bearing is mounted against axial movement adjacent the end of the casing, the other end of the bearing being free to move axially in the casing, a driving spindle, a bearing therefor mounted in the other end of the casing, said bearing being mounted against relative axial movement at the outer end of the bearing, the other end of the bearing being free to move axially in the casing, and a flexible coupling forming a driving connection between the adjacent ends of the spindles.

11. In a spindle and bearing construction, a spindle, a bearing in which the spindle is journaled, said bearing being mounted against axial movement with relation to the outer end of the casing, said bearing being free at its other end to move axially of the casing, said bearing and said spindle being constructed to prevent relative axial movement at the inner ends thereof, whereby inward prolongation of the bearing under a rise in temperature will compensate for outward prolongation of the spindle and prevent axial movement of the outer end of the spindle.

12. In a spindle and bearing construction, a spindle having a tapered section, a tapered bearing in which the tapered section of the spindle is journaled, said bearing and spindle being relatively axially immovable at the smaller ends of the converging portions, a casing in which said bearing is mounted against axial movement at the larger end of the bearing, the smaller end of the bearing being free to move axially in the casing, the coefficient of expansion of the metals forming the spindle and the bearing and the angle of the tapered parts being so related that inward prolongation of the bearing compensates for outward prolongation of the spindle and prevents axial movement of the outer end of the spindle.

KAY C. MILLER.